May 7, 1963 R. C. MOORE 3,089,096

STEREOPHONIC DETECTOR AND MATRIXING CIRCUIT

Filed April 9, 1959 4 Sheets-Sheet 1

INVENTOR.
ROBERT C. MOORE
BY
Robert D. Sanborn
ATTORNEY

INVENTOR.
ROBERT C. MOORE
BY
Robert D. Sanborn
ATTORNEY

STEREOPHONIC DETECTOR AND MATRIXING CIRCUIT

Filed April 9, 1959 4 Sheets-Sheet 3

INVENTOR.
ROBERT C. MOORE
BY
Robert D. Sanborn
ATTORNEY

INVENTOR.
ROBERT C. MOORE
BY
Robert D. Sanborn
ATTORNEY 3,089,096
Patented May 7, 1963

1

3,089,096

STEREOPHONIC DETECTOR AND MATRIXING CIRCUIT

Robert C. Moore, Huntingdon Valley, Pa., assignor, by mesne assignments, to Philco Corporation, Philadelphia, Pa., a corporation of Delaware Filed Apr. 9, 1959, Ser. No. 805,178
16 Claims. (Cl. 329—135)

The present invention relates to stereophonic radio receivers and more particularly to stereophonic detector and matrixing circuits for compatible amplitude modulation stereophonic receivers.

It has been proposed that stereophonic program signals representing a complete program be multiplexed on a carrier wave assigned to an amplitude modulation radio station in such a way that the resultant signal may be received by existing monophonic receivers as a monophonic program signal and by stereophonic receivers as a stereophonic program signal. One way in which this may be accomplished is by modulating one of the pair of stereophonic program signals on a carrier wave which is at a first phase, modulating the second stereophonic program signal of the pair on a second carrier wave which is at a quadrature phase, and then linearly combining the two modulated carrier waves. The resultant signal may be reproduced as a monophonic program signal by envelope detecting the composite signal. The stereophonic reproduction of the program material requires that the resultant signal be detected in such a manner that the two stereophonic program signal components present in the composite wave are separately directed to respective audio reproducing channels at the stereophonic receiver. In the past this stereophonic detection of the complex wave has been accomplished by means of synchronous detectors or by combinations of synchronous detectors, envelope detectors and matrixing circuits. These circuits of the prior art are relatively complex and hence expensive to manufacture.

Therefore it is an object of the present invention to provide a relatively simple and inexpensive stereophonic detector and matrixing circuit.

It is a further object of the present invention to provide a stereophonic detector and matrixing circuit which obviates the need for automatic frequency control of the stereophonic receiver.

An additional object of the present invention is to provide a stereophonic detector and matrixing circuit which employs only asynchronous detectors.

A further object of the present invention is to provide a stereophonic detector circuit which requires only diode and triode detector and amplifier elements.

Still another object of the invention is to provide an improved discriminator circuit for use in stereophonic receivers and the like.

An additional object of the present invention is to provide a discriminator circuit in which the crossover frequency is automatically corrected to the average carrier frequency of the incoming signal.

In general these and other objects of the present invention are realized by providing a detector circuit having two outputs, each of which provides a signal which is a function of the amplitude modulation and frequency modulation present on the signal supplied to the detector circuit. The two output signals of the detector circuit are supplied to a differential amplifier circuit which functions as a combined amplifier circuit, matrix and integrator circuit. Control of the crossover frequency of the signal detector circuit disclosed in this application is achieved by controlling the amplitude of the signal supplied to each half of the detector circuit.

2

For a better understanding of the present invention together with other and further objects thereof reference should be had to the following detailed description which is to be read in conjunction with the accompanying drawings in which.

Figure 1:
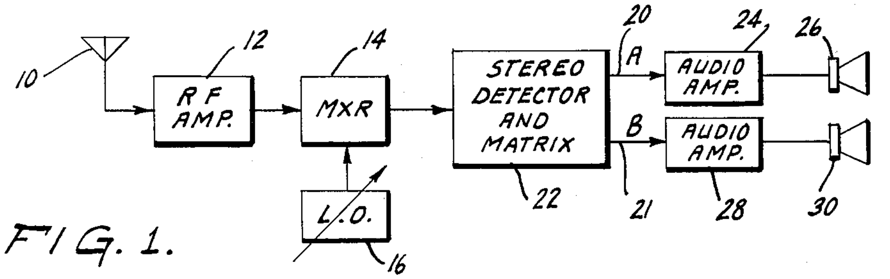
FIG. 1 is a block diagram of a receiver circuit for compatible amplitude modulation stereophonic signals.

Turning now to FIG. 1 it will be seen that the stereophonic receiver shown in block form comprises an antenna 10, a radio frequency amplifier 12, a heterodyne mixer 14 and a tunable local oscillator 16 all of which may be conventional in construction. The intermediate frequency signal from mixer 14 is supplied to a stereophonic detector and matrixing circuit 22. The circuit represented by block 22 comprises means to provide separate A and B program signals output leads 20 and 21, respectively. The "A" program signal is one stereophonic program signal of the pair and the "B" signal is the second stereophonic program signal of the pair. The signal from output 20 is passed through audio amplifier 24 to the A channel speaker 26. Similarly the signal from output 21 is supplied through audio amplifier 28 to the B channel speaker 30. A balancing control (not shown) may be included in either or both of amplifiers 24 and 28 for equalizing the level of the output signals from speakers 28 and 30, respectively.

Figure 2:
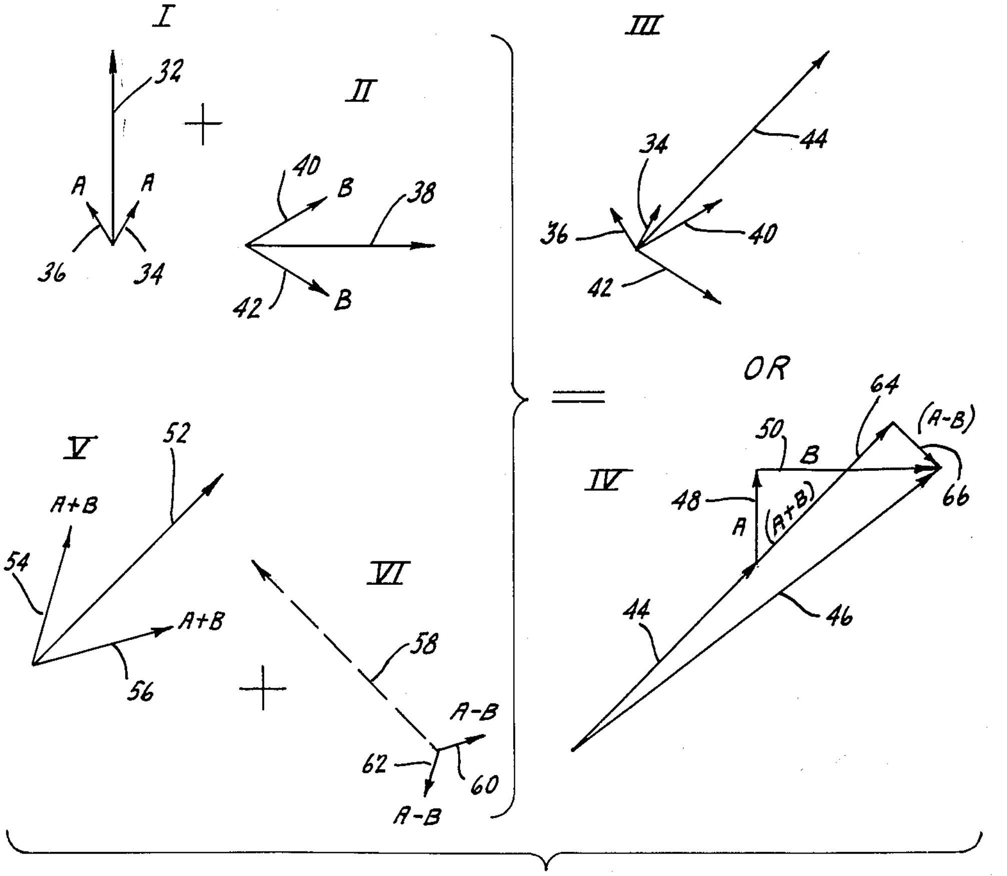
FIG. 2 is a series of vector diagrams which illustrate the nature of the signals processed by the receiver of FIG. 1.

FIG. 2 is a series of vector diagrams which illustrate the nature of the signal to be received by the circuit shown in FIG. 1. The heterodyning process in mixer 14 will change only the frequency of the carrier wave without changing the relative positions of the vectors shown in FIG. 2. Therefore the vector diagrams of FIG. 2 represent both the signals received at antenna 10 and the signals supplied to the input of stereophonic detector circuit 22. As shown at I and II at FIG. 2 the composite program signal which is broadcast over the channel assigned to the amplitude modulation station may be formed by amplitude modulating the A program signal on a carrier wave having a first phase represented by the vector 32 in FIG. 2–I. As a result of the modulation process the A program signal will appear as sideband vectors 34 and 36 which rotate in opposite directions with respect to the vector 32 as is well known. The B program signal is amplitude modulated on a second carrier wave which is in phase quadrature with the carrier wave represented by vector 32. This second carrier wave is represented by vector 38. The B program signals will appear as sideband vectors 40 and 42. The linear addition of the vector systems shown at I and II in FIG. 2 will result in a signal which may be represented by the vector system shown at III in FIG. 2. The resultant carrier wave may be represented by vector 44 which is the vector sum of vectors 32 and 38. Associated with carrier wave 44 are sideband components which are represented by vectors 34, 36, 40 and 42. These four sideband vectors correspond to the similarly numbered vectors at I and II in FIG. 2. The signal represented by the vector system shown at III in FIG. 2 may be represented also by a single vector 46 shown at IV in FIG. 2. Vector 46 represents the vector sum of the carrier vector 44 and two vectors 48 and 50. Vectors 48 and 50 represent the A and B signals, respectively. Vector 44 is a constant amplitude vector representing the average amplitude of the carrier wave. Vector 48 varies in amplitude in a cyclic manner owing to the constantly changing phase between vectors 34 and 36. Similarly vector 50 varies in amplitude at the frequency of the modulating signal of the B program signal and is equal in amplitude to the instantaneous sum of vectors 40 and 42. It will be seen that vector 46 will vary in amplitude and phase in a manner determined by the characteristics of the A and B program signals.

A second means for generating the signals represented by the vector systems shown at III and IV in FIG. 2 is illustrated at V and VI of FIG. 2. The vector system shown at V in FIG. 2 represents a carrier wave 52 which is modulated in amplitude by the sum of the A and B program signals to produce the sideband vectors 54 and 56, respectively. A second carrier wave which is in phase quadrature with the carrier wave represented by vector 52 is amplitude modulated by the difference of the two program signals in a suppressed carrier modulator. The phase of this second carrier wave is represented by vector 58 at VI in FIG. 2. The sideband output signals from the suppressed carrier modulator are represented by the vectors 60 and 62 at VI in FIG. 2. Vector 64 in FIG. 2–IV represents the vector sum of vectors 54 and 56 of FIG. 2–V. Vector 64 is in phase with the unmodulated carrier wave vector 52 or vector 44 and hence represents amplitude modulation of this vector. Vector 66 represents the vector sum of vectors 60 and 62 of FIG. 2–IV. Vector 66 is in phase quadrature with vector 44 owing to the quadrature phase relationship between the carrier wave vectors 52 and 58. Vector 66 represents primarily phase modulation at the carrier wave vector 44. It will be seen that the sum of vectors 44, 64 and 66 is identical to the sum of vectors 44, 48 and 50.

Since vector 46 is modulated in both phase and amplitude by amounts determined by the A and B program signals it is also possible to generate the signal represented by vector 46 by phase modulating a carrier wave in accordance with one combination of the A and B program signals and then amplitude modulating the resultant wave by means of a different combination of the A and B program signals. However since the present invention is concerned only with the method of demodulating the complex wave and not in the specific means for generating the wave, no further description of this means for generating the complex wave will be given.

Figure 3:
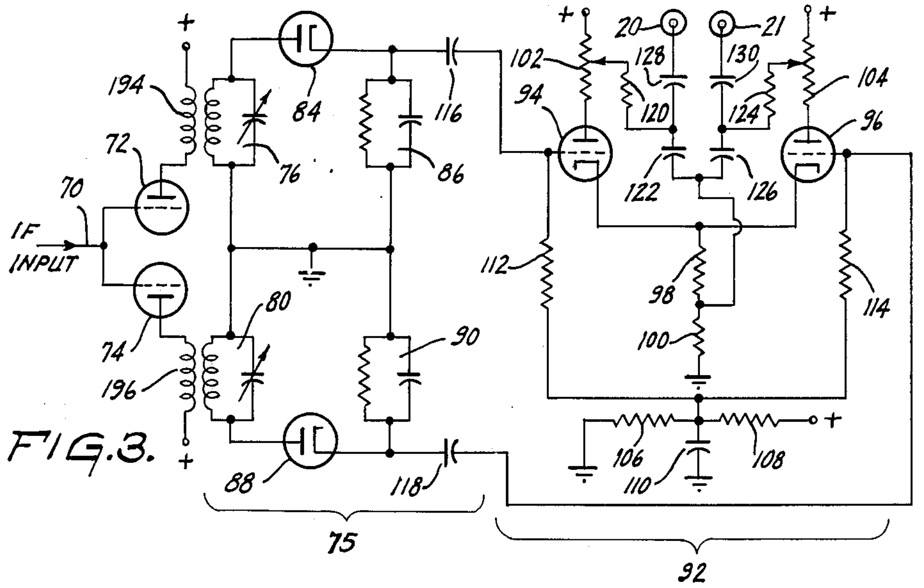
FIG. 3 is a schematic diagram of a stereophonic detector and matrixing circuit arranged in accordance with the present invention and which may be used in a receiver of the type shown in FIG. 1.

The function of the stereophonic demodulator and matrix circuit 22 of FIG. 1 is to demodulate the complex wave represented by the vector system of FIG. 2–III or FIG. 2–IV to recover the A and B program signals. A preferred form of stereophonic detector and matrixing circuit arranged in accordance with the present invention is shown in FIG. 3. In FIG. 3 the complex intermediate frequency signal from mixer 14 is supplied to input connection 70. The IF signal from input lead 70 is supplied to the control grids of a pair of intermediate frequency amplifier stages which are partially shown at 72 and 74, respectively. The portions of the amplifier circuits not shown may be arranged in conventional fashion.

The portion of the circuit encompassed by bracket 75 in FIG. 3 comprises two similar amplitude detector circuits each of which has a frequency selective circuit as the input signal source. These two detector circuits have one terminal in common. Tuned circuit 76 which acts as the signal source for one of the detector circuits is inductively coupled to the anode load of amplifier stage 72. Circuit 76 is tuned to a frequency below the average carrier frequency of the signal supplied at input 70 as represented by curve 78 in FIG. 3A. A second tuned circuit 80 which acts as the signal source for the other detector circuit is inductively coupled to the anode load impedance of intermediate frequency amplifier stage 74. Circuit 80 is tuned above the average carrier frequency of the input signal as represented by the curve 82 in FIG. 3A. For convenience, the frequency at which the curves 78 and 82 have equal amplitude is hereinafter referred to as the crossover frequency of the combined detector circuit 75. The similarity between this crossover frequency and the crossover frequency of a conventional discriminator circuit will appear as the description of the invention proceeds. The detector circuit associated with tuned circuit 76 comprises diode 84 and audio load impedance 86. The detector circuit associated with tuned circuit 80 comprises diode 88 and audio load impedance 90.

The portion of the circuit of FIG. 3 within the bracket 92 is a combined differential amplifier, matrix and integrator circuit. The two electron tubes 94 and 96 share a common cathode load which comprises resistors 98 and 100. These two tubes are provided with separate anode loads 102 and 104. Resistors 106 and 108 and capacitor 110 of FIG. 3 form a source of grid bias potential for tubes 94 and 96. The grids of tubes 94 and 96 are connected to the source of bias potential through the usual grid leak resistors 112 and 114, respectively. The bias supplied by resistors 106 and 108 is such that the grids of tubes 94 and 96 are biased to approximately the midpoint of their linear range.

The signals appearing across audio load impedance 86 is supplied to the control grid of tube 94 through coupling capacitor 116. Similarly, the signal appearing across audio load impedance 90 is supplied to the control grid of tube 96 through coupling capacitor 118.

Resistor 120 and capacitor 122 form an audio frequency integrator circuit. The capacitor terminal of this integrator circuit is connected to the junction between resistors 98 and 100. The resistor terminal of the integrator circuit is connected to a tap on resistor 102 in the anode circuit of tube 94. Resistor 124 and capacitor 126 form a second integrator circuit which is connected between the junction of resistors 98 and 100 and a tap on the load resistor 104 of tube 96.

The junction of resistor 120 and capacitor 122 is coupled to the output connection 20 of the stereophonic detector circuit through a coupling capacitor 128. The junction of resistor 124 and capacitor 126 is coupled to the output connection 21 through coupling capacitor 130.

The circuit of FIG. 3 operates as follows. The intermediate frequency signal obtained from the mixer 14 of FIG. 1 is supplied to the discriminator 75 without limiting. As shown in FIG. 2, the carrier wave supplied to input 70 is amplitude modulated. The amplitude modulation signal approximates the sum of the two stereophonic program signals. Any change in the amplitude of the intermediate frequency signal will result in corresponding changes in the amplitude of the signals appearing across audio load impedances 86 and 90. The signals appearing across loads 86 and 90 as a result of the amplitude modulation of the input signal will have the same polarity with respect to ground.

The resonant frequencies of tuned circuits 76 and 80 are placed substantially symmetrically below and above the average carrier frequency of the incoming intermediate frequency signal. The variable phase of the intermediate frequency signal may be considered to be a phase modulation of the carrier wave by a signal approximating the difference of the two stereophonic program signals. It may also be considered as a frequency modulation of the carrier wave by a signal which approximates the time derivative of the difference signal. It will be seen from FIG. 3A that an increase in the carrier frequency of the intermediate frequency signal will cause the detected signal appearing across load 86 to decrease and the corresponding signal appearing across load 90 to increase.

Turning now to the differential amplifier 92 of FIG. 3 it will be seen that if the grids of tubes 94 and 96 change potential in the same direction as a result, for example, of amplitude modulation of the signal supplied at input 70, the change in cathode current will be in the same direction in each of the tubes 94 and 96. Therefore, the audio signal appearing across resistors 98 and 100 will be representative of the $(A+B)$ amplitude modulation component of the intermediate frequency signal. The combined resistance of resistors 98 and 100 is made large compared to the reciprocal of the transconductance of tubes 94 and 96 so that similar changes in potential on the grids of tubes 94 and 96 will produce no appreciable change in the grid to cathode potential of the two tubes. Since there is no appreciable change in the grid to cathode signal there will be no appreciable change in the anode potential of the two tubes.

If the potential at the grid of tube 94 decreases while the potential at the grid of tube 96 increases as a result, for example, of the frequency modulation of the intermediate frequency carrier wave, the anode-cathode current in tube 94 will decrease while the anode-cathode current in tube 96 will increase. Resistors 98 and 100 carry the cathode currents for each of the tubes 94 and 96. Therefore there will be no appreciable net change in the current through resistors 98 and 100 and the cathodes of tubes 94 and 96 will remain at substantially their former potential. The decrease in the grid potential of tube 94 will result in an increase in the potential of the anode of tube 94. Similarly an increase in the potential at the grid of tube 96 will result in a decrease in the potential of the cathode of tube 96. Therefore the audio signals appearing across resistors 102 and 104 will be proportional to the frequency modulation of the intermediate frequency carrier wave supplied at input 70. The signal appearing across resistor 102 will be oppositely phased from the signal appearing across resistor 104.

The signal appearing across capacitor 122 will be proportional to the time integral of the signal appearing between the tap on potentiometer 102 and the junction between resistors 98 and 100. The resistor 98 is made large compared to resistor 100 so that the effect of the $(A+B)$ signal on the integrated signal appearing across capacitor 122 is relatively minor. Therefore the signal appearing across capacitor 122 is substantially proportional to the integral of the frequency modulation component of the carrier wave. This integral of the frequency modulation component is proportional to the phase modulation of the intermediate frequency carrier wave. As pointed out above, the phase modulation of the IF carrier wave is representative of $(A-B)$ that is, the difference of the two stereophonic program signals. Similarly the signal appearing across capacitor 126 is proportional to the phase modulation of the intermediate frequency signal at input 70. The audio frequency signal which appears across capacitor 122 is proportional to $(A-B)$ and the signal across resistor 100 is proportional to $(A+B)$. The ratio of voltage divider 98—100 and the position of the tap on potentiometer 102 are adjusted so that the B component appearing across capacitor 122 is equal to the B component appearing across resistor 100. Therefore the signal appearing at output connection 20 will be solely the A stereophonic program signal. Similarly the signal appearing across capacitor 126 is proportional to $-(A-B)$. The position of the tap on resistor 104 is adjusted so that the A component of the signal across capacitor 126 is equal to the A component of the signal across resistor 100. Therefore the signal at output 21 is proportional to the B component only of the stereophonic program signals. As shown in FIG. 1 the A and B program signals are passed through the separate audio amplifiers 24 and 28 to the speakers 26 and 30, respectively.

The operating of the circuit of FIG. 3 may also be visualized by assuming that the over-all characteristic of the signal detector circuit 75 and the differential amplifier 92 causes the characteristic of the signal at the plate of tube 96 to be the sum of the characteristic 78 and the inverse of characteristic 82. The inverse of characteristic 82 is shown at 150 in FIG. 3A. The resulting frequency vs. amplitude characteristic at the anode of tube 96 is represented by the resultant curve 152. The characteristic at the anode of tube 94 will be the mirror image of curve 152 about the frequency axis.

Any difference between the average frequency of the incoming carrier wave and the crossover frequency of the combined circuit 75—92 will move the operating point along characteristic curve 152 away from the zero crossover point. This will reduce the linear range of the system on one side of the operating point and may produce distortion for large values of $(A-B)$ signal. Furthermore it will cause the amplitude components of the signals which result from amplitude modulation of the signal supplied at input 70 to be unequal. This will cause the signals at the anodes of the tubes 94 and 96 to be a function of the amplitude modulation component of the signal supplied at input 70. The resulting crosstalk between the two stereophonic channels 20 and 21 may be tolerated in low cost receivers. However, in high quality receivers it is preferable to maintain a coincidence between the average carrier frequency of the incoming signal and the crossover frequency of the detector circuit.

Figures 3A, 4:
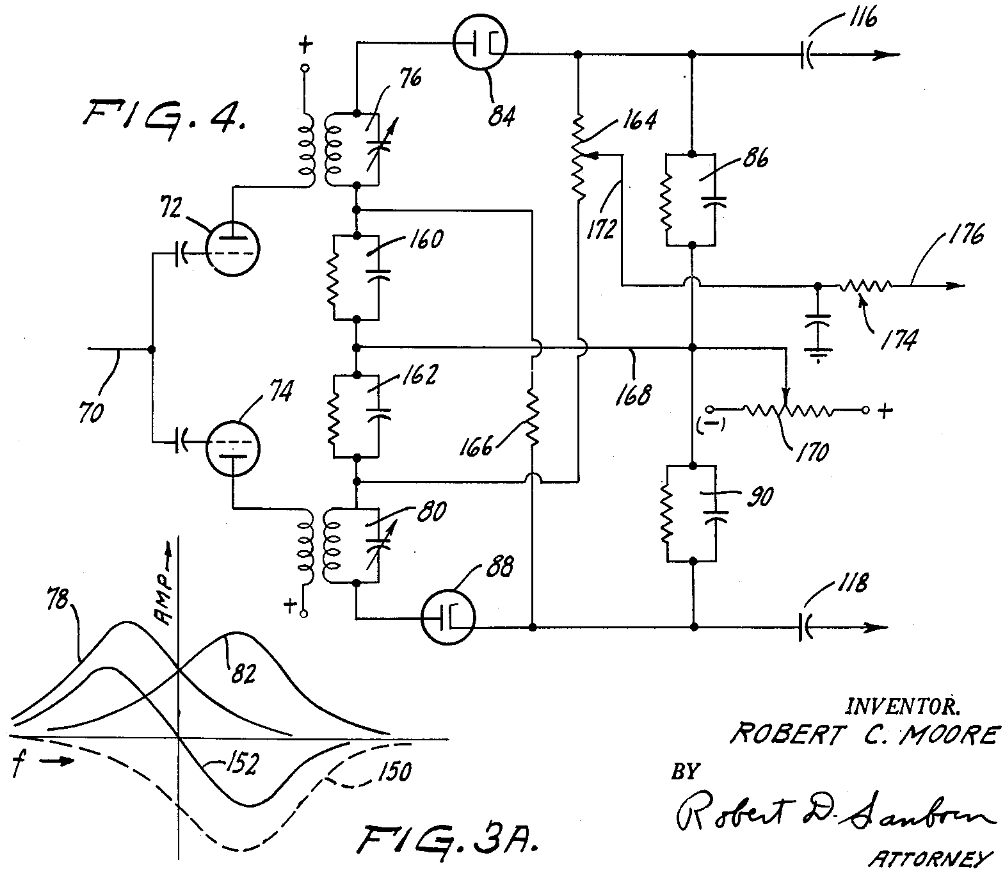
FIG. 3A is a series of waveforms which explain the operation of the circuit of FIG. 3.
FIG. 4 is a schematic diagram of an alternative form of detector circuit which may be employed in the circuit of FIG. 3.

FIG. 4 shows a discriminator circuit which is modified to provide a signal having an amplitude which is a function of the deviation of the average carrier frequency of the intermediate frequency signal from the crossover frequency of the discriminator circuit. Parts in the circuit of FIG. 4 corresponding to like parts in the signal detector 75 of FIG. 3 have been identified by the same reference numerals. The discriminator of FIG. 4 differs from the signal detector of FIG. 3 in that it includes two additional audio frequency load impedances 160 and 162. Load 160 is in circuit with diode 84 and load 86. Load 162 is in circuit with diode 88 and load 90. Load circuit 162 is preferably similar to load circuit 86. A potentiometer 164 is connected across load circuits 86 and 162 in series. A balancing resistor 166 is connected across load circuits 160 and 90 in series. The common connection 168 of the two halves of the discriminator circuit is shown connected to a source of adjustable bias potential 170. Alternatively, the common connection 168 may be returned to ground or to a fixed source of positive or negative bias depending upon the nature of the circuit being controlled. Tap 172 on potentiometer 164 is connected through a low pass filter 174 to the control output 176.

The circuit of FIG. 4 operates in the manner of the signal detector 75 of FIG. 3 to develop signals across load circuits 86 and 90 which are functions of the amplitude modulation and frequency modulation of the intermediate frequency signals supplied to input 70. In addition, an audio frequency signal is developed across load circuit 162 which is opposite in polarity to the signal developed across load circuit 86. Preferably the constants of load circuit 162 are selected so that the amplitude of the signal across load circuit 162 is equal to the amplitude of the signal across load circuit 86 when the frequency of the signal supplied to input 70 is approximately midway between the resonant frequencies of circuits 76 and 80. Assuming that the load circuits are related in this fashion, the mid-point of potentiometer 164 will be at the same signal potential as reference point 168 if the frequency of the input signal is midway between the resonant frequencies of circuits 76 and 80. If the frequency of the input signal increases, the potential across load circuit 86 will decrease and the signal across load circuit 162 will increase. Hence the mid-point of potentiometer 164 will become negative with respect to reference point 168. Similarly a decrease in the frequency of the input signal will cause the mid-point of potentiometer 164 to become positive with respect to the reference point 168. The audio frequency component of the signal present at the mid-point of potentiometer 164 which results from the modulation of the input signal for the difference signal will be bypassed to ground by the low pass filter 174. However any slow drift in the average carrier frequency of the signal supplied to input 170 will cause the potential of output lead 176 to change with respect to the reference point 168. This change in potential on control lead 176 may be employed as a frequency control signal to servo the frequency of the local oscillator signal to the frequency of the discriminator. Alternatively the signal may be employed in the circuit shown in FIG. 5 to change the crossover frequency of the discriminator circuit to coincide with the average frequency of the incoming carrier wave. Tap 172 is adjustable to correct for any unbalance in the two halves of the discriminator circuit or to provide control over the frequency of the carrier wave signal which will cause the tap 172 to be at zero potential with respect to reference point 168.

Load circuit 160 and resistor 166 are provided for the purpose of maintaining the symmetry of the circuit. The omission of these elements may introduce a slight asymmetry in the output characteristics of the discriminator. In general this asymmetry can be tolerated in low cost discriminator circuits. If a push-pull control signal is desired, the second signal may be taken from the mid-point of resistor 166.

Figure 5:
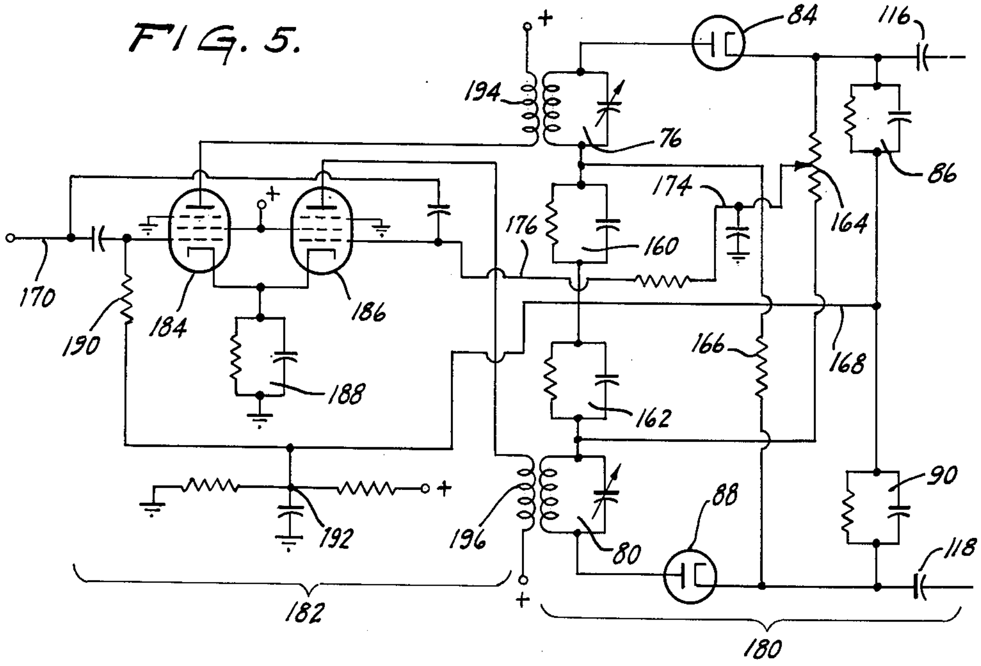
FIG. 5 is a schematic diagram of a novel signal detector circuit which includes means for maintaining the crossover frequency at the average frequency of the incoming carrier wave.

FIG. 5 illustrates an improved discriminator circuit which is arranged to correct the crossover frequency to the average carrier frequency of the incoming signal. The portion of the circuit enclosed by bracket 180 corresponds to the circuit shown in FIG. 4. Parts in FIG. 5 corresponding to like parts in FIG. 4 are identified by the same reference numerals. The portion of the circuit enclosed by bracket 182 comprises two parallel amplifier circuits which have a differential gain control circuit responsive to the signal present on control lead 176 of discriminator portion 180.

The input intermediate frequency signal on lead 170 is supplied equally to the control grids of electron tubes 184 and 186. Tubes 184 and 186 are remote cut-off pentode tubes which have a gain that is a function of grid bias. The screen grids and suppressor grids of each of the tubes 184 and 186 are connected to a fixed positive voltage and to ground, respectively, in a conventional fashion. Tubes 184 and 186 share a common parallel resistor-capacitor self-bias circuit 188. A grid leak resistor 190 is connected from the control grid of tube 184 to a source of fixed positive bias 192. Reference point 168 of discriminator circuit 180 is also connected to bias source 192. Control output 176 of discriminator 180 is connected back to the control grid of tube 186. The inductive anode load impedance 194 of tube 184 is coupled to load circuit 76 so as to supply the amplifier intermediate frequency signal thereto. The inductive anode load impedance 196 of tube 186 is similarly coupled to tuned circuit 80. Load impedance 194 and tuned circuit 76 together form a frequency selective coupling circuit which is tuned to a frequency below the desired crossover frequency of the discriminator. Obviously other known forms of frequency selective coupling circuits may be employed between amplifier portion 182 and discriminator portion 180. A similar substitution may be made for the tuned circuit 80 and load impedance 196.

Figure 6:
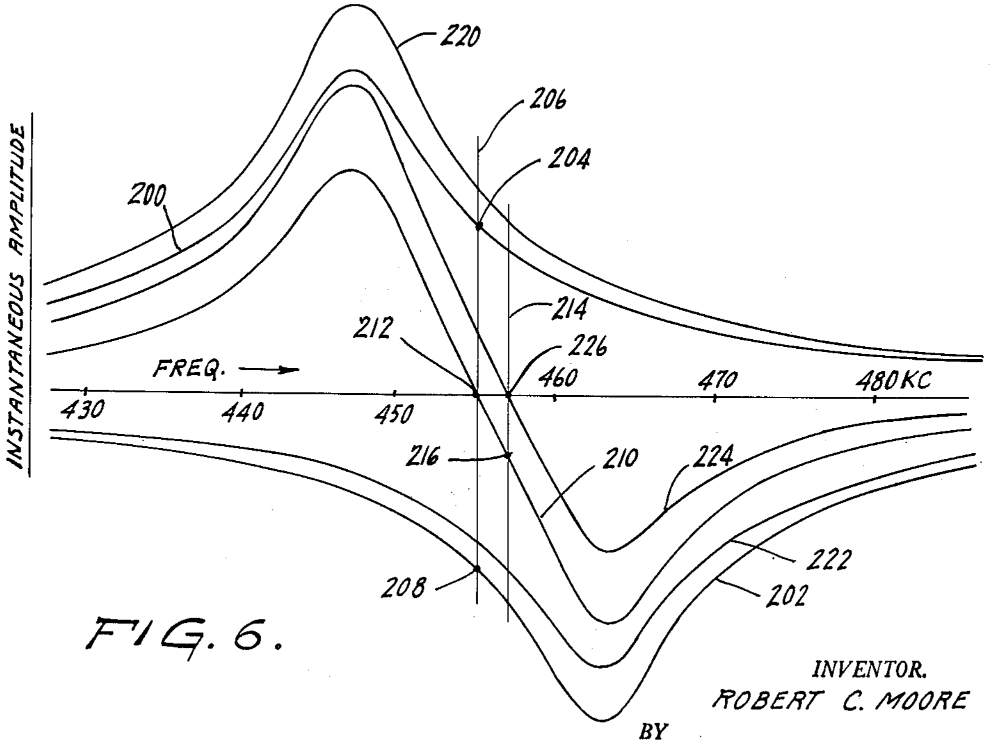
FIG. 6 is a series of waveforms which explain the operation of the circuit of FIG. 5.

The operation of the circuit of FIG. 5 will be explained with reference to the curves of FIG. 6. Curves 200 and 202 in FIG. 6 illustrate the instantaneous amplitude vs. frequency signal transfer characteristic from input 170 to load circuits 86 and 162, respectively, for the condition that the average frequency of the carrier wave is such as to provide equal signals across audio load circuits 86 and 162, respectively. Curves 200 and 202 assume also that the gains of the amplifier stages including tubes 184 and 186 are equal. Point 204 represents the average signal potential across load circuit 86. Frequency modulation of the input signal supplied to input 170 will cause the potential across load circuit 86 to vary about point 204 along curve 200. Amplitude modulation of the input signal will have the effect of instantaneously expanding and contracting the vertical scale of curve 200. That is, amplitude modulation of the input signal without frequency modulation will cause the instantaneous amplitude of the signal developed across load circuit 86 to increase and decrease about point 204 along the vertical line 206.

Point 208 represents the average potential appearing across load circuit 162. The signal at the center of potentiometer 164 is equal to the algebraic sum of the curves 200 and 202. Therefore the amplitude vs. frequency characteristic for the mid-point of potentiometer 164 is represented by the curve 210 at FIG. 6. Since the average operating point 212 on curve 210 is at zero amplitude level, control lead 176 will be at the same potential as reference point 168, the grids of tubes 184 and 186 will be at the same potential and the gain of the two stages including electron tubes 184 and 186 will be equal.

Suppose now that the average carrier frequency of the signal supplied to input connection 170 increases to a value represented by the vertical line 214 in FIG. 6. The average potential at the mid-point of potentiometer 164 will tend to increase to point 216 on curve 210. However the negative potential developed on control output 176 causes the cathode current and the gain of tube 186 to decrease. Since tubes 184 and 186 share the common cathode load circuit 38 the cathode current and the gain of tube 184 will increase. The increase in gain of the stage including tube 184 causes the signal voltage developed across load circuit 86 to follow the curve 220 instead of curve 200. Similarly the decrease in gain of the stage including tube 186 causes the signal appearing across load circuit 162 to decrease as represented by curve 222. The signal at the mid-point of potentiometer 164 is again the sum of the curves 220 and 222 which is represented in FIG. 6 by the curve 224. Therefore changing the gain of the amplifier stages including tubes 184 and 186 has the effect of moving the crossover of the discriminator characteristic curve from point 212 to point 226 which is at approximately the average carrier frequency of the incoming wave as represented by vertical line 214. Since the system shown in FIG. 5 is an error controlled servo loop the crossover frequency cannot be moved to coincide exactly with the average carrier frequency of the incoming signal at any point other than point 212. However the error between the crossover frequency and the average frequency of the incoming signal may be made equal to any arbitrary low value by appropriately controlling the gain of the servo loop.

As mentioned in connection with the description of FIG. 4 a signal which varies in the opposite sense to the signal present on lead 176 may be obtained from the mid-point of balancing resistor 166. Therefore it would be possible to replace the amplifier circuit 182 of FIG. 5 with two separate amplifier stages in which the gain of one stage is controlled by the signal obtained from the mid-point of potentiometer 164 and the gain of the other stage is controlled by the signal at the mid-point of resistor 166. The circuit as thus modified will operate in the same manner as the circuit shown in FIG. 5.

Figure 7:
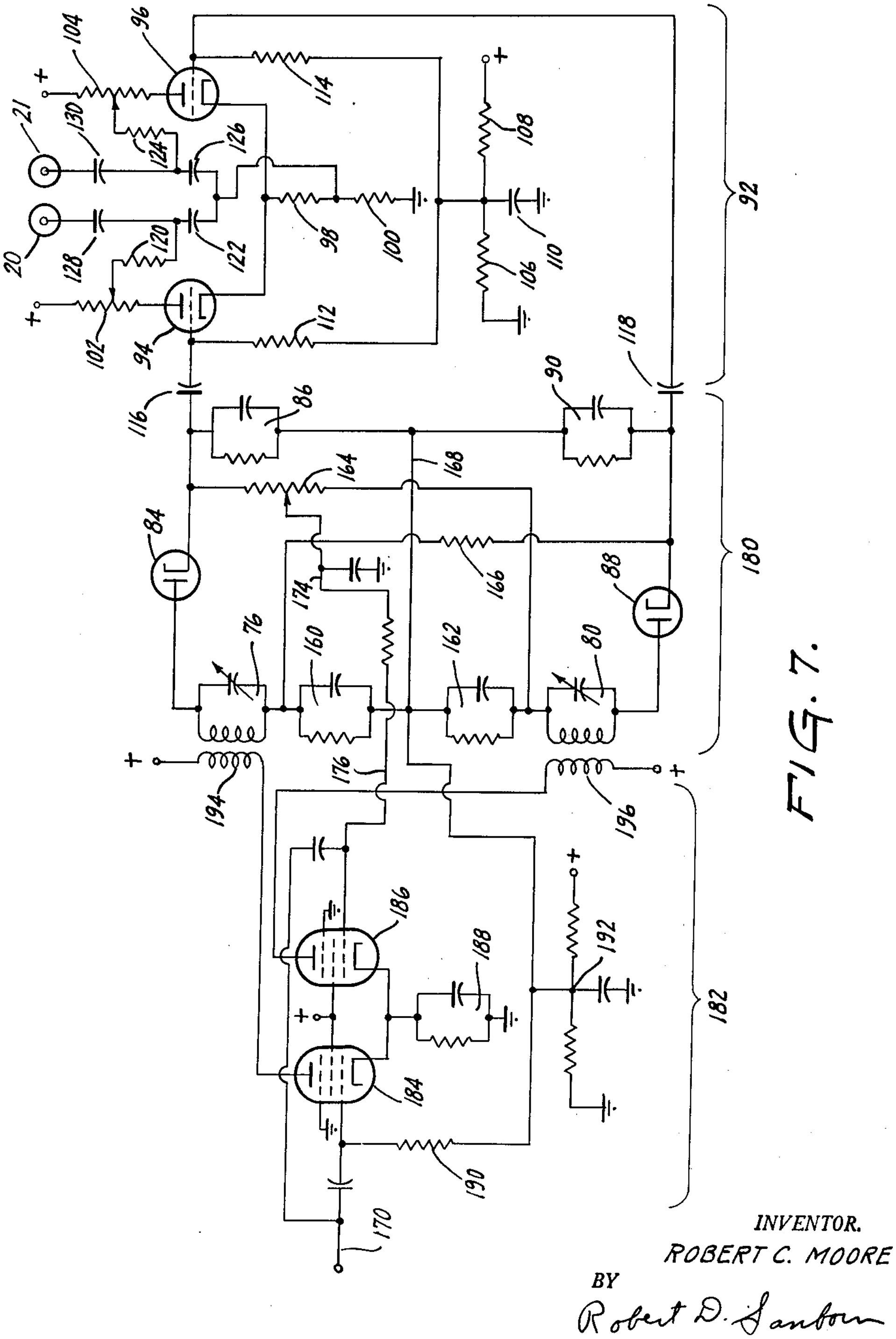
FIG. 7 is a stereophonic detector and matrixing circuit in which the differential amplifier and matrixing circuit of FIG. 3 are connected to the output of the signal detector circuit of FIG. 5.

FIG. 7 shows a stereophonic detector and matrix circuit which comprises a discriminator of FIG. 5 combined with the amplifier circuit 92 of FIG. 3. Parts in FIG. 7 corresponding to like parts in FIGS. 3 and 5 have been identified by the same reference numerals. In the circuit of FIG. 7 a signal which is both angularly modulated and modulated in amplitude is applied equally to the control grids of the two tubes 184 and 186 by way of connection 170. The output of the amplifier stages including tubes 184 and 186 are supplied to tuned circuits 76 and 80, respectively, by way of load impedances 194 and 196. The tap on potentiometer 164 of FIG. 7 is adjusted so that the signal supplied to the grid of tube 186 by way of low pass filter 174 will maintain the cross-over frequency of the discriminator circuit at a preselected frequency, usually the average frequency of the incoming signal on input 170.

The two output signals of the discriminator circuit 180 are coupled to the control grids of tubes 94 and 96, respectively, in the differential amplifier 92. A signal proportional to the sum of the two detected signals will appear at the junction of resistors 98 and 100. A signal representative of the difference of the two detected signals will appear at the anodes of tubes 94 and 96. The signals at the anodes of tubes 94 and 96 will be out of phase with one another. It will be seen that the signal appearing at the junction of resistors 98 and 100 is proportional to the amplitude modulation of the signal supplied at input 170. The signals appearing at the anodes of tubes 94 and 96 will be representative of the angular modulation of the signal supplied at input 170. Integrator circuits 120—122 and 124—126 function in the manner described in connection with FIG. 3. Therefore the signal at output 20 will represent the A component of the signal supplied at input 170 and the signal at output 21 will represent the B component of the stereophonic signal supplied at input 170.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

What is claimed is:

1. A circuit for demodulating a complex wave which is modulated in amplitude as a function of the sum of two information signals and is angularly modulated as a function of the difference of said two information signals, said circuit comprising means responsive to said complex wave for generating first and second detected signals, said first and second detected signals varying in amplitude in the same sense in response to the amplitude modulation component of said complex wave and varying in amplitude in the opposite sense in response to the angular modulation of said complex wave, means for generating a third signal which is proportional to the amplitude variations of said first and second detected signals which are in the same sense, means for generating a fourth signal which is proportional to the instantaneous difference of said first and second detected signals, integrating means responsive principally to said fourth signal for providing a fifth signal representative of the time integral of said fourth signal, means for generating a sixth signal which is the inverse of said fifth signal, means for combining said third signal and said fifth signal to provide a first output signal representative principally of a first one of said information signals, and means for combining said third and said sixth signals to provide a second output signal representative principally of said second information signal.

2. A circuit for demodulating a complex wave which is modulated in amplitude as a function of the sum of two information signals and in phase as a function of the difference of said two information signals, said circuit comprising means responsive to said complex wave for generating first and second detected signals, said first and second detected signals varying in amplitude in the same sense in response to the amplitude modulation component of said complex wave and varying in amplitude in the opposite sense in response to frequency modulation of said complex wave, a differential amplifier circuit comprising two amplifier elements, first and second load impedances which are individually associated with said first and second amplifier elements respectively, and a third load impedance connected in common to said two amplifier elements, means for supplying said first and second signals to the control inputs of said first and second amplifier elements respectively, first and second integrating means responsive principally to the signals appearing across said first and second load impedances respectively, means for additively combining the output signal of said first integrating means and a selected fraction of the signal appearing across said third load impedance to provide a first output signal representative principally of a first one of said information signals, and means for additively combining the output signal of said second integrating means and a selected fraction of the signal appearing across said third load impedance to provide a second output signal representative principally of the second one of said information signals.

3. A circuit for demodulating a complex wave which is modulated in amplitude as a function of the sum of two information signals and in phase as a function of the difference of said two information signals, said circuit comprising means responsive to said complex wave for generating first and second detected signals, said first and second detected signals varying in amplitude in the same sense in response to the amplitude modulation component of said complex wave and varying in amplitude in the opposite sense in response to frequency modulation of said complex wave, a differential amplifier element comprising first and second electron tubes each having an anode, a cathode and a control grid, the cathodes of said two electron tubes being connected together, a first load element connected between said cathodes and a point of fixed reference potential, a second load element connected from said anode of said first electron tube to a source of anode potential, a third load element connected from the anode of said second electron tube to a source of anode potential, a first integrator circuit connected from a point on said second load element to a point on said first load element, a second integrator circuit connected from a point on said third load element to a point on said first load element, said last-mentioned points on said first, second and third load elements being points other than said source of anode potential and said point of reference potential, means for supplying said first and second detected signals to said control grids of said first and second tubes, respectively, and means for deriving first and second output signals from said first and second integrator circuits, respectively.

4. A circuit in accordance with claim 3 wherein said first, second and third load elements are resistive load elements.

5. A circuit in accordance with claim 3 wherein said first, second and third load elements are resistive load elements and wherein said first load element has a resistance large compared to the reciprocal of the transconductance of said first and second tubes.

6. A signal detector circuit comprising first and second frequency selective circuits having different frequencies of maximum response, first variable gain amplifier means for supplying a signal to said first frequency selective circuit, second variable gain amplifier means for supplying a signal to said second frequency selective circuit, each of said first and second amplifier means having a gain which is continuously variable over a selected range in response to a gain control signal supplied thereto, first amplitude detector means including a first diode and a first resistor-capacitor load in series circuit coupled to said first frequency selective circuit, second amplitude detector means including a second diode and a second resistor-capacitor load in series circuit coupled to said second frequency selective circuit, signal combining means connected to said first and second load circuits for providing a signal indicative of the average difference in magnitude of the signals appearing across said first and second load circuits, and means for supplying said output signal of said combining means to said first and second amplifier means to control the gains of said two amplifier means in opposite directions within said selected range.

7. A demodulator circuit for demodulating a complex wave which is modulated in amplitude as a function of one signal and is angularly modulated as a function of another signal, said circuit comprising means responsive to said complex wave for generating first and second detected signals, said first and second detected signals varying in amplitude in the same sense in response to the amplitude modulation of said complex wave and varying in amplitude in the opposite sense in response to the angular modulation of said complex wave, an amplifier circuit having first and second inputs and first and second outputs, the signal at said first output being proportional to the instantaneous difference between the signals supplied to said two inputs, and the signal at said second output being proportional to the instantaneous sum of the signals supplied to said two inputs, and means for supplying said first detected signal to said first input and said second detected signal to said second input.

8. A demodulator circuit in accordance with claim 7 wherein said amplifier circuit is provided with a third output, the time variable component of the signal at said third output being equal in amplitude but opposite in polarity to the time variable signal at said first output, said circuit further comprising means for additively combining a signal derived from the signal at said first output with the signal at said second output to provide a first combined signal, and means for additively combining the signal at said second output with a signal derived from the signal at said third output to provide a second combined signal.

9. A demodulator circuit according to claim 8 wherein said signals derived from said signals at said first and third outputs are signals representative of the time integral of the signals appearing at said first and third outputs, respectively.

10. A circuit for demodulating a complex wave which is modulated in amplitude as a function of the sum of two information signals and is angularly modulated as a function of the difference of said two information signals, said circuit comprising means responsive to said complex wave for generating first and second detected signals, said first and second detected signals varying in amplitude in the same sense in response to the amplitude modulation component of said complex wave and varying in amplitude in the opposite sense in response to angular modulation of said complex wave, an amplifier circuit having first and second inputs, means for supplying said first detected signal to said first input and said second detected signal to said second input, and first, second and third outputs, the signal at said first output being representative of the instantaneous difference of the signal at said two inputs, the signal at said second output having a time variable component which is the inverse of the signal at said first output, the signal at said third output being representative of the instantaneous sum of the signal supplied to said two inputs of said amplifier, first and second integrating means responsive principally to the signals appearing at said first and second outputs, respectively, means for additively combining the output signal of said first integrating means and the signal at said third output to provide a first combined signal representative principally of the first one of said information signals, and means for additively combining the output signal of said second integrating means and the signal at said third output to provide a second combined signal representative principally of the second one of said information signals.

11. A circuit for demodulating a complex wave which is modulated in amplitude as a function of the sum of two information signals and is angularly modulated as a function of the difference of said two information signals, said circuit comprising means responsive to said complex wave for generating first and second detected signals, said first and second detected signals varying in amplitude in the same sense in response to the amplitude modulation component of said complex wave and varying in amplitude in the opposite sense in response to the angular modulation of said complex wave, a differential amplifier circuit comprising two amplifier elements, first and second load impedances which are individually associated with said first and second amplifier elements, respectively, and a third load impedance connected in common to said two amplifier elements, means for supplying said first and second signals to the control inputs of said first and second amplifier elements, respectively, frequency sensitive signal combining means for combining the signal appearing across said first load impedance and a selected fraction of the signal appearing across said third load impedance to provide a first output signal representative principally of a first one of said information signals, and frequency sensitive signal combining means for combining the signal appearing across said second load impedance and a selected fraction of the signal appearing across said third load impedance to provide a second output signal representative principally of the second one of said information signals.

12. A circuit for demodulating a complex wave which is modulated in amplitude as a function of the sum of two sum of two information signals and is angularly modulated as a function of the difference of said two information signals, said circuit comprising means responsive to said complex wave for generating first and second detected signals, said first and second detected signals varying in amplitude in the same sense in response to the amplitude modulation component of said complex wave and varying in amplitude in the opposite sense in respect to the angular modulation of said complex wave, a differential amplifier circuit comprising first and second amplifier elements each having first and second electrodes defining a main signal path and a control electrode for controlling the current flowing between said first and second electrodes through said main signal path, said first electrodes of said two amplifier elements being connected together, a first load element connected between said joined first electrodes and a point of fixed reference potential, a second load element connected from said second electrode of said first amplifier element to a source of bias potential, a third load element connected from said second electrode of said second amplifier element to a source of bias potential, a first integrator circuit connected from a point on said second load element to a point on said first load element, a second integrator circuit connected from a point on said third load element to a point on said first load element, said last-mentioned points on said first, second and third load elements being points other than said source of bias potential and said point of reference potential, means for supplying said first and second detected signals to said control electrodes of said first and second amplifier elements, respectively, and means for deriving first and second output signals from said first and second integrator circuits, respectively.

13. In a signal demodulating circuit, the combination comprising a differential amplifier circuit comprising first and second amplifier elements having first and second electrodes defining a main signal path and a control electrode for controlling the signal in said main signal path, the first electrodes of said two amplifier elements being connected together, a first load element connected between said joined first electrodes and a point of fixed reference potential, a second load element connected from said second electrode of said first amplifier element to a source of bias potential, a third load element connected from said second electrode of said second amplifier element to a source of bias potential, a first integrator circuit connected from a point on said second load element to a point on said first load element, a second integrator circuit connected from a point on said third load element to a point on said first load element, said last-mentioned points on said first, second and third load elements being points other than said sources of bias potential and said point of reference potential, means for supplying first and second signals to said control electrodes of said first and second amplifier elements, respectively, and means for deriving first and second output signals from said first and second integrator circuits, respectively.

14. A signal detector circuit comprising first and second frequency selective circuits having different frequencies of maximum response, amplifier means for supplying a modulated signal to said first and second frequency selective circuits, said signal being supplied in the same phase to each frequency selective circuit, first amplitude detector means including a first diode and a first resistor-capacitor load circuit in series circuit, said first amplitude detector means being coupled across said first frequency selective circuit, second amplitude detector means including a second diode and a second resistor-capacitor load in series circuit, said second amplitude detector means being coupled across said second frequency selective circuit, signal combining means connected to said first and second load circuits for providing a signal indicative of the difference in magnitude of the signals appearing across said first and second load circuits, low pass filter means coupled to the output of said signal combining means, and means coupled to said amplifier means-frequency selective circuit combination and responsive to the output of said low pass filter means for maintaining a selected ratio between the amplitudes of the signals appearing across said two frequency selective circuits at the average frequency of said modulated signal.

15. A signal detector circuit comprising three two-terminal resistor-capacitor load impedances each having one terminal thereof connected to a point of reference potential, two series combinations each comprising a frequency selective circuit and a diode detector element, said frequency selective circuit being connected to the same electrode of the diode detector element in each series combination, means coupling one of said series circuits between the second terminals of two of said resistor-capacitor load impedances, one terminal of said second series combination being coupled to the second terminal of the third load impedance, means coupling the remaining terminal of said second series combination to said point of reference potential, potential divider means coupling the junction of said frequency selective circuit of said first series combination and one of said load impedances to said second terminal of said third load impedance, means for supplying a modulated signal to the frequency selective circuit in each of said series combinations and means for deriving output signals from two of said resistor-capacitor load impedances and said potential divider.

16. A signal detector circuit comprising first and second frequency selective circuits having different frequencies of maximum response, signal supplying means for supplying a modulated signal to be detected to each of said first and second frequency selective circuits, said signal supplying means being responsive to a signal supplied to a control input thereof for incrementally controlling the relative magnitude at which said modulated signal is supplied to said first and second frequency selective circuits, first amplitude detector means coupled to said first frequency selective circuit, second amplitude-detector means coupled to said second frequency selective circuit, signal combining means connected to said first and second detector means for providing a signal indicative of the average difference in the magnitude of the signals provided by said first and second amplitude detector means, and means connecting the output of said signal combining means to said control input of said signal supplying means.

References Cited in the file of this patent

UNITED STATES PATENTS

| | | |
|---|---|---|
| 2,075,071 | Usselman | Mar. 30, 1937 |
| 2,261,628 | Lovell | Nov. 4, 1941 |
| 2,378,298 | Hilferty | June 12, 1945 |
| 2,562,703 | Dome | July 31, 1951 |
| 2,611,036 | Norgaard | Sept. 16, 1952 |
| 2,619,547 | Ross | Nov. 25, 1952 |
| 2,698,379 | Boelens et al. | Dec. 28, 1954 |
| 2,744,961 | Peek | May 8, 1956 |
| 2,851,532 | Crosby | Sept. 9, 1958 |
| 2,858,422 | Reyburn et al. | Oct. 28, 1958 |
| 2,874,221 | Dauguet | Feb. 17, 1959 |
| 2,917,623 | Crosby | Dec. 15, 1959 |